United States Patent
Jiang et al.

(10) Patent No.: US 7,698,555 B2
(45) Date of Patent: Apr. 13, 2010

(54) SYSTEM AND METHOD FOR ENABLING SECURE ACCESS TO A PROGRAM OF A HEADLESS SERVER DEVICE

(75) Inventors: Ping Jiang, Pullman, WA (US); Kevin L. Carson, Troy, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 1262 days.

(21) Appl. No.: 11/214,391

(22) Filed: Aug. 29, 2005

(65) Prior Publication Data

US 2007/0067625 A1    Mar. 22, 2007

(51) Int. Cl.
H04L 9/00        (2006.01)
(52) U.S. Cl. .................. 713/168; 713/169; 713/170; 726/2; 726/5; 726/12
(58) Field of Classification Search ................. None
See application file for complete search history.

(56) References Cited

U.S. PATENT DOCUMENTS

| | | | |
|---|---|---|---|
| 6,134,591 A | 10/2000 | Nickles | |
| 6,292,892 B1 | 9/2001 | Davis | |
| 6,754,820 B1 | 6/2004 | Scheidt et al. | |
| 6,757,825 B1 | 6/2004 | MacKenzie | |
| 7,234,157 B2* | 6/2007 | Childs et al. | 726/2 |
| 2002/0194478 A1 | 12/2002 | MacKenzie | |
| 2003/0023848 A1 | 1/2003 | Wray | |
| 2003/0026428 A1 | 2/2003 | Loisel | |
| 2003/0046391 A1 | 3/2003 | Moreh | |
| 2003/0056097 A1* | 3/2003 | Araki et al. | 713/168 |
| 2003/0204724 A1 | 10/2003 | Ayyagari | |
| 2004/0073797 A1 | 4/2004 | Fascenda | |
| 2004/0255137 A1* | 12/2004 | Ying | 713/193 |

OTHER PUBLICATIONS

RSA Laboratories, "PKCS #5 v2.0: Password-Based Cryptography Standard," Mar. 25, 1999, USA.
Schweitzer Engineering Laboratories, Inc., "Secure and Efficient Communication for Server Configuration, ...," Oct. 27, 2004, USA.

* cited by examiner

*Primary Examiner*—Nasser Moazzami
*Assistant Examiner*—Fikremariam Yalew
(74) *Attorney, Agent, or Firm*—Eugene M. Cummings, P.C.

(57) ABSTRACT

Provided is a system and method for enabling secure access to a desired end-point server program of at least one end-point server program. The system includes a server having a security server program and the end-point server programs, and a client. During operation, the server establishes a first connection with the client via a known port, causes an end-point program applet and web page associated with the desired end-point server program to be forwarded to the client. While executing the security server program, the server: verifies client access rights via a first encryption means, generates, encrypts and transmits to the client a random port number and a session key, and detects establishment of a second connection between the client and a random port of the server. The second connection enables secure access by the client to the desired end-point server program using a second encryption means and the session key.

48 Claims, 6 Drawing Sheets

SEL-3306 General Configuration

Configuration /302
- PDC General Data
- Network
- Email
- PMU Serial Connection
- PMU Ethernet Connection
- PDC Output
- Diagnostics
- Current Configuration

PDC General Data

PDCSTN /304  [Station A]
Station Name (16 Characters)

PDCID /306  [0]
PDC ID (maximum 40 characters)

NFREQ /308   ○ 50   ● 60
(Nominal System Frequency)

MRATE /310   [1] ▶   6/6
Input Rate per Second

MWAITP /312  [10]
(Maximum Message Waiting Period (10, 11, ..., 1000 ms))

Error Message

FIG. 6

SYSTEM AND METHOD FOR ENABLING SECURE ACCESS TO A PROGRAM OF A HEADLESS SERVER DEVICE

CROSS-REFERENCE TO RELATED APPLICATIONS

None

BACKGROUND OF THE INVENTION

The present invention generally relates to controlling access to a headless server, and more specifically, to a system and method for enabling secure access to a program of a headless server device.

The need to protect server- or computer-based systems from malicious activity such as eavesdropping or intruder modification and tampering is well known. The need is especially important for critical infrastructures that include computer-based systems such as, for example, a three phase power system, or electrical power grid, providing electrical power to end users and loads.

Many techniques have been developed in an attempt to establish secure and controlled access and/or communication with a server-based system. For example, U.S. Pat. No. 6,754,820 ('820 patent), entitled "Multiple Level Access System," naming Scheidt et al. as inventors, discloses a technique for controlling access to computer-based systems. The technique utilizes both symmetric key algorithms (i.e., secret key cryptography) and asymmetric key algorithms (i.e., public key cryptography) with emphasis being placed on asymmetric encryption to establish a credential scheme. The credential is a key pair used for access control where the public key is referred to as the write key and the private key is referred to as a read key. Different credentials are associated with different access levels.

In summary, symmetric encryption uses a shared secret key (i.e., a 128 bit data string) to encrypt (to form cipertext) and decrypt (to form plaintext) messages passed between, for example, a client (sender/receiver) and a server (sender/receiver), where both the client and the server know the secret key. Such encryption and decryption may be performed using one of any suitable algorithms such as data encryption standard (DES) where transmitted messages are encrypted in form during transmission through a public domain such as the Internet. A vulnerability of symmetric encryption however, results from the key distribution mechanism because the secret key, in some form, must traverse the transmission medium between the client and the server.

Asymmetric encryption uses a public/private key pair in which the public key is used (by the sender/server) to encrypt a message and the private key is used (by the receiver/client) to decrypt the message, and vice versa. A message encrypted by the public key can only be decrypted by the private key. Authentication of the sender/server (i.e., verifying that the sender of a public key is the rightful owner of the public key) is typically done through use of a digital certificate. The receiver obtains the digital certificate containing the sender/server's public key from a mutually trusted certificate authority such as VeriSign. The digital certificate is incorporated in the encrypted message so that fraudulent attempts to use another's public key will result in unreadable messages. The digital certificate essentially binds a public key to an entity.

While providing a level of protection, the multiple level access system of the '820 patent includes no provisions for further security measures such as randomizing port selection to thwart an eavesdropper who may have access to a known port or ports used for the encrypted message exchange. When a port number is ascertained by an eavesdropper, a number of vulnerabilities exist. For example, the eavesdropper may determine an application running on the server and may further inject instructions, packets and code via the known port. An eavesdropper may also upload an operating system file to gain control over the server; an unacceptable scenario for critical systems such as the electrical power grid.

SUMMARY OF THE INVENTION

In general, the system and a method for enabling secure access to a program of a headless server device disclosed herein provides secure access by a user of a remote client computer (i.e., an intelligent client device) to one or more end-point server programs of a headless server (i.e., an intelligent server device). After (1) establishing a first connection between the intelligent server device and the intelligent client device, (2) verifying the intelligent client device's access right to a security server program of the intelligent server device via both a hashing algorithm and a first encryption/decryption means, (3) establishing a second connection between a randomly selected port of the intelligent server device and the intelligent client device, and (4) a second encryption/decryption means including a randomly generated session key is used to encrypt/decrypt content transmitted via the second connection. This ensures that any modifications to the headless server's resources (i.e., data storage, kernel), or to resources of devices coupled to or under the control of the intelligent server device, are performed by authorized personnel only.

In accordance with an embodiment of the invention, provided is a system for enabling secure access to a desired end-point server program of at least one end-point server program. The system includes an intelligent server device having a first microcontroller. The first microcontroller has access to a security server program and the end-point server programs where each of the end-point server programs is associated with an aspect of operation of the intelligent server device. The system also includes an intelligent client device having an input device, a display unit and a second microcontroller operatively coupled to the input device and the display unit. During operation, the first microcontroller establishes a first connection between the intelligent client device and a known port of the intelligent server device, causes an end-point program applet and web page associated with the desired end-point server program to be forwarded to the intelligent client device, and while executing the security server program: authenticates and verifies intelligent client device access rights to the security server program via a first encryption means. The first microcontroller then selects a random port number and creates a session key if the intelligent client device access rights are authenticated and validated, causes the random port number and the session key to be encrypted via the first encryption means, transmits the encrypted random port number and session key to the intelligent client device, and detects establishment of a second connection between the intelligent client device and a random port corresponding to the random port number. The second connection enables secure access by the intelligent client device to the desired end-point server program where execution of a task associated with the desired end-point server program includes a second encryption means associated with the session key.

In accordance with another embodiment of the invention, provided is a system for enabling secure access to a desired end-point server program of at least one end-point server program. The system includes an intelligent server device having a first microcontroller. The first microcontroller has access to a security server program and the end-point server programs where each of the end-point server programs is associated with an aspect of operation of the intelligent server device. The system also includes an intelligent client device having an input device, a display unit and a second microcontroller operatively coupled to the input device and the display unit. During operation, the second microcontroller detects establishment of a first connection between the intelligent client device and a known port of the intelligent server device, receives an end-point program applet and web page associated with the desired end-point server program to be forwarded to the intelligent client device, and while executing the end-point program applet: detects authentication and verification of access rights to the security server program where the authentication and verification includes a first encryption means. The second microcontroller also receives and decrypts an encrypted random port number and an encrypted session key via the first encryption means. The session key and random port number are generated and encrypted via the first encryption means by the first microcontroller executing the security server program. The second microcontroller also detects establishment of a second connection with a random port (associated with the random port number) of the intelligent server device. The second connection enables secure access by the intelligent client device to the desired end-point server program where execution of a task associated with the desired end-point server program includes a second encryption mean associated with the session key.

In accordance with yet another aspect of the invention, provided is a method for enabling secure access by an intelligent client device to a desired end-point server program of at least one end-point server program of an intelligent server device where the end-point server programs are associated with an aspect of operation of the intelligent server device. The intelligent server device further includes a security server program. The method includes establishing a first connection between the intelligent client device and a known port of the intelligent server device, causing an end-point program applet and web page associated with the desired end-point server program to be forwarded to the intelligent client device, and while executing the security server program: authenticating and verifying intelligent client device access rights to the security server program via a first encryption means. The method also includes selecting a random port number and creating a session key if the intelligent client device access rights are authenticated and validated, causing the random port number and the session key to be encrypted via the first encryption means, transmitting the encrypted random port number and session key to the intelligent client device, and detecting establishment of a second connection between the intelligent client device and a random port corresponding to the random port number. The second connection enables secure access by the intelligent client device to the desired end-point server program where execution of a task associated with the desired end-point server program includes a second encryption mean associated with the session key.

In accordance with yet a further aspect of the invention, provided is a method for enabling secure access by an intelligent client device to a desired end-point server program of at least one end-point server program of an intelligent server device where the end-point server programs are associated with an aspect of operation of the intelligent server device. The intelligent server device further includes a security server program. The method includes detecting establishment of a first connection between the intelligent client device and a known port of the intelligent server device, receiving an end-point program applet and web page associated with the desired end-point server program, and while executing the end-point program applet: detecting authentication and verification of access rights to the security server program where the authentication and verification includes a first encryption means. The method also includes receiving and decrypting an encrypted random port number and an encrypted session key via the first encryption means. The session key and random port number are generated and encrypted via the first encryption means by the first microcontroller executing the security server program. The method further includes detecting establishment of a second connection with a random port (associated with the random port number) of the intelligent server device. The second connection enables secure access by the intelligent client device to the desired end-point server program where execution of a task associated with the desired end-point server program includes a second encryption mean associated with the session key.

It should be understood that the present invention includes a number of different aspects or features which may have utility alone and/or in combination with other aspects or features. Accordingly, this summary is not exhaustive identification of each such aspect or feature that is now or may hereafter be claimed, but represents an overview of certain aspects of the present invention to assist in understanding the more detailed description that follows. The scope of the invention is not limited to the specific embodiments described below, but is set forth in the claims now or hereafter filed.

BRIEF DESCRIPTION OF THE DRAWINGS

FIG. 6 is an exemplary graphic user display that may be displayed to a user of the intelligent client device of FIG. 2 when gaining secure access to a program of the intelligent server device, according to an embodiment of the invention.

DETAILED DESCRIPTION OF THE INVENTION

Figure 1:
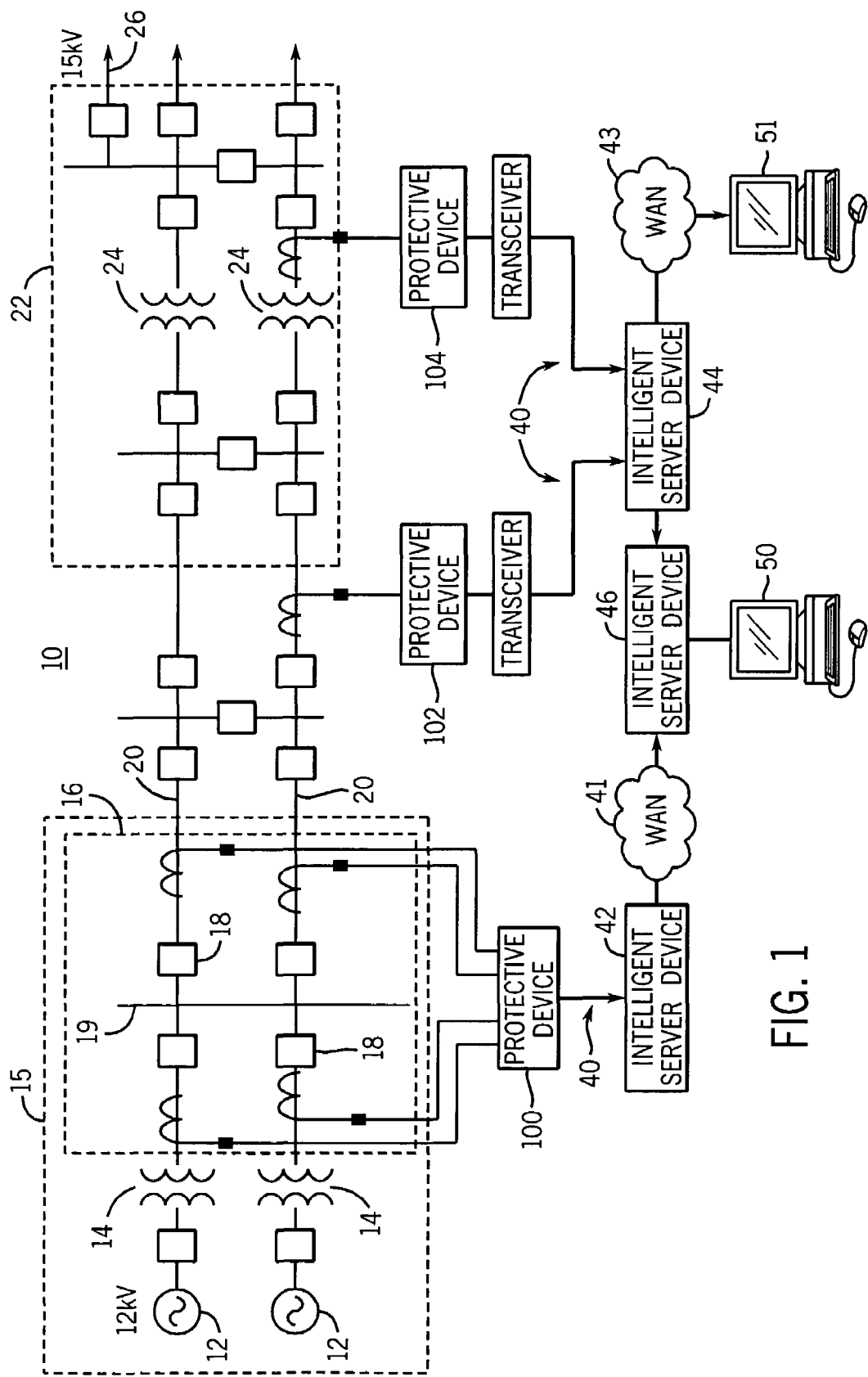
FIG. 1 is a single line schematic diagram of a power system that may be utilized in a typical metropolitan area.

As noted above, the need to protect computer-based systems from malicious activity is especially important for critical infrastructures such as, for example, a power system, or electrical grid, that relies on protective devices and associated computer-based communication networked elements for secure operation. FIG. 1 is a single line schematic diagram of a power system 10, including associated protective relays and a computer-based networked communication system that may be utilized in a typical metropolitan area. As illustrated in FIG. 1, the power system 10 includes, among other things, two generators 12 configured to generate three-phase sinusoidal waveforms, for example, three-phase 12 kV sinusoidal waveforms, two step-up transformers 14 configured to increase the 12 kV sinusoidal waveforms to a higher voltage such as 345 kV and a number of circuit breakers 18. The step-up transformers 14 provide the higher voltage sinusoidal waveforms to a number of long distance transmission lines such as the sub-transmission lines 20. In an embodiment, a first substation 15 may be defined to include the generators 12, the step-up transformers 14, and the circuit breakers 18, all interconnected via a first bus 19. At the end of the long distance sub-transmission lines 20, a second substation 22 includes step-down transformers 24 to transform the higher voltage sinusoidal waveforms to lower voltage sinusoidal waveforms (e.g., 15 kV) suitable for distribution via a distribution line to various end users 26 and loads 30.

As previously mentioned, the power system 10 includes protective devices and procedures to protect the power system elements from faults or other abnormal conditions The protective devices and procedures utilize a variety of protective logic schemes to determine whether a fault or other problem exists in the power system 10. Some types of protective relays utilize a current differential comparison to determine whether a fault exists in a protection zone. For example, a first protective device 100, configured as a current differential relay, provides fault protection for the sub-transmission lines 20 of a protection zone 16.

Other types of protective devices compare the magnitudes of calculated phasors, representative of the three phase sinusoidal waveforms, to determine whether a fault exists in the protection zone. Frequency sensing techniques and harmonic content detection is also incorporated in protective relays to detect fault conditions. Similarly, thermal model schemes are utilized by protective relays to determine whether a thermal problem exists in the protection zone.

In addition to protective devices and procedures, the power system 10 includes a networked communication system 40 adapted to route relay data, thermal data, metering data, to name a few, to one or more computer-based platforms. The computer-based platforms may operate to enable engineering control and monitoring access capability, data processing, data alignment, software upgrades, configuration control and visualization (i.e., display of phasors representative of the currents and voltages in various areas of the power system 10). Thus, in addition to computer-based platforms, the networked communication system 40 may include a number of routers, Ethernet hubs, modems, communications processors interconnected via serial, Ethernet and the like.

Referring again to FIG. 1, the power system 10 includes the first protective device 100 coupled to the protection zone 16 via a number of current transformers, a second protective device 102 similarly coupled to one of the sub-transmission lines 20 and a third protective device 104 coupled to a distribution line in the second substation 22.

In general, each of the first, second and third protective devices 100, 102, 104 include one or more relay elements (e.g., directional overcurrent element, instantaneous overcurrent element, time overcurrent element, overvoltage element). During operation, secondary (or stepped-down) voltage and current waveforms provided by the current transformers and voltage transformers, respectively, coupling the protective devices 100, 102, 104 to the power system 10, are processed. Typically, the secondary waveforms are filtered, multiplexed, sampled and then digitized to form corresponding digitized current sample streams (e.g., 101100) suitable for use by a microcontroller of the protective devices 100, 102, 104. The corresponding digitized current sample streams are digitally filtered via, for example, a Cosine filter to eliminate DC and unwanted harmonic frequency components. The microcontroller of the protective devices 100, 102, 104 executing a computer program, protection algorithm or relay logic scheme (based on the relay elements) processes each of the digitized current sample streams to extract phasors, each having a magnitude and phase angle representative of each of the primary waveforms, and then performs various calculations using the phasors to determine whether a fault (e.g., a short circuit) exists in the protection zone 16 or in a protected sub-transmission line or distribution line, to name a few.

In addition to a number of relay elements, each of the first, second and third protective devices 100, 102, 104 is configured for serial or Ethernet communication with a computer-based platform such as a first intelligent server device 42, via the networked communications system 40. The intelligent server devices 42, 44, 46 may be adapted to perform one of any number of functions associated with protective device monitoring, configuration and management and real-time control of the protective devices 100, 102, 104, thereby precluding a need for power system personnel to travel to each protective device to perform monitoring and configuration tasks. For example, the first intelligent server device 42 may be configured to concentrate phasor data from connected protective devices for purposes of aligning, storing and/or analyzing phasor data.

As illustrated in FIG. 1, a number of intelligent server devices are included in the power system 10. The first intelligent server device 42 is operatively coupled to the first protective device 100. A second intelligent server device 44 is operatively coupled to both the second and third protective devices 102, 104, via respective transceivers that enable serial data from the protective devices to be transmitted via an Ethernet-based networked communication system 40 to one or more other computer-based platform(s), or intelligent client devices 50, 51. In the illustrated example, the second intelligent server device 44 is operatively coupled to an intelligent client device 51 via a wide area network (WAN) 43 to form a data processing system. In addition, both of the first and second intelligent server devices 42, 44 are operatively coupled to a third intelligent server device 46 in a hierarchical arrangement, and are accessible by the intelligent client device 50.

As noted above, data collected and processed by the intelligent server device(s) 42, 44, 46, and accessed by the intelligent client device(s) 50, 51 may be utilized for a variety of purposes such as to enable engineering control and monitoring access capability, data storage, real-time data alignment, software upgrades, configuration control and visualization, alarm and email notification of an error condition such as a communication failure, notification of a power system fault, to name a few. For example, in an embodiment, calculated phasors of time-stamped secondary current and voltage waveforms are collected, time-aligned, and then forwarded by the intelligent server device 46 (as described in connection with FIGS. 2 and 3) to the intelligent client device 50 to enable, among other things, general power system configuration and device status, error log monitoring, data retrieval, user account management and selective software upgrades.

Figure 2:
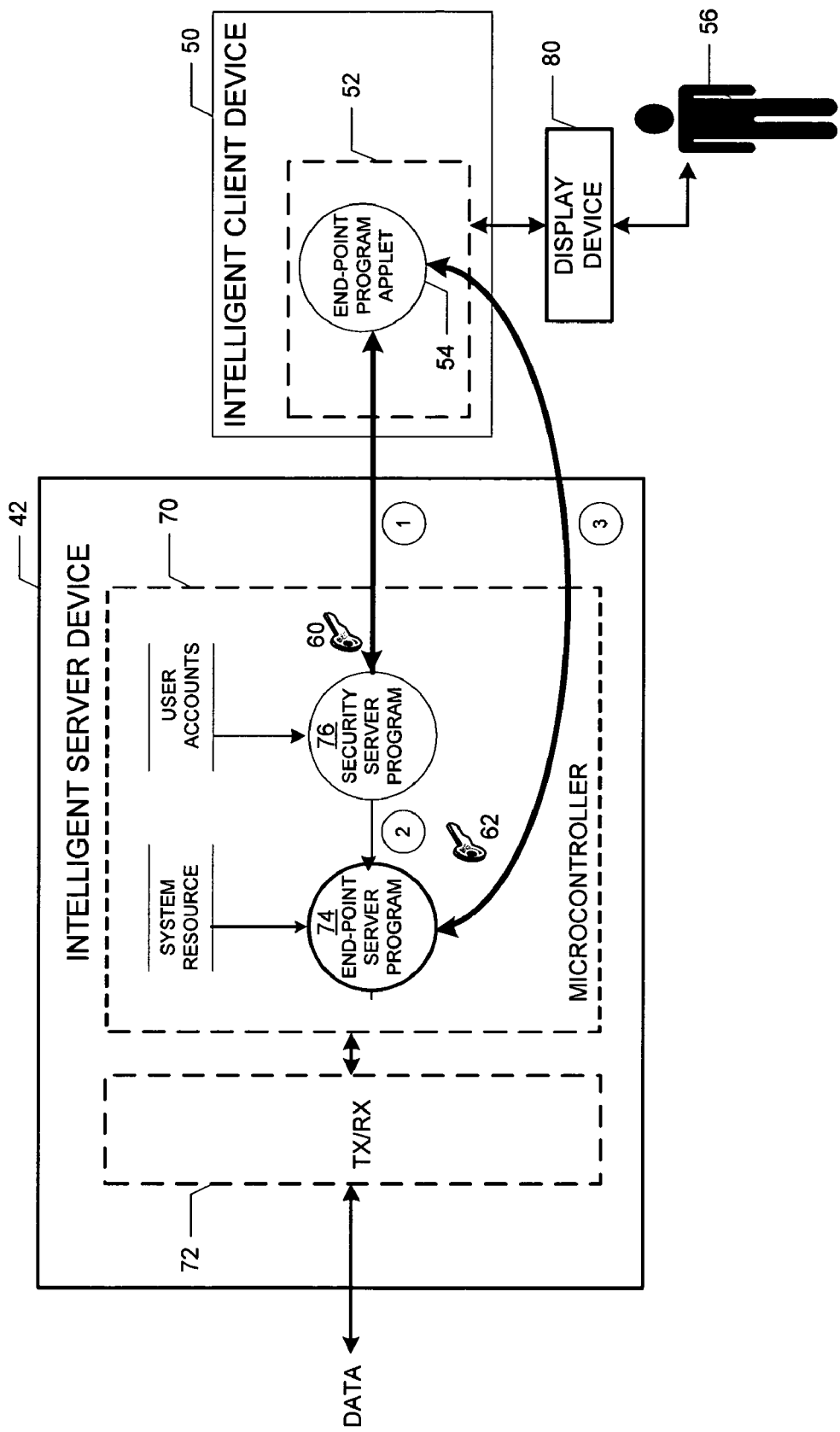
FIG. 2 is a block diagram of an intelligent server device configured to enable secure access to a program of the intelligent server device by an intelligent client device, according to an embodiment of the invention.

FIG. 2 is a functional block diagram of an intelligent server device such as one of the intelligent server devices 42, 44, 46, configured to enable secure access to a program of the intelligent server device by an intelligent client device such as the intelligent client device 50, 51, according to an embodiment of the invention. Such secure access enables a user 56 located at the intelligent client device 50, 51, to perform a number of real-time control, maintenance and configuration tasks associated with the intelligent server devices 42, 44, 46 and their coupled protective devices 100, 102, 104, such as, for example, setting the programmable logic in the protective devices 100, 102, 104 and/or error log reporting from the protective device 100, 102, 104 to the intelligent server device 42, 44, 46. Although discussed in terms of an intelligent server device(s) and an intelligent client device(s), the system and method disclosed herein is applicable to any intelligent, or computer-based, system where remote access to a program running on one of the intelligent devices of the intelligent system.

As illustrated, the intelligent server device 42 includes a first microcontroller 70 operatively coupled to a transceiver 72. The transceiver 72 may be one of any number of suitable transceivers (e.g., RF transceiver, Ethernet transceiver) adapted to communicate and exchange data with other devices such as the protective devices 100, 102, 104 or a corresponding transceiver via the networked communications system 40.

The first microcontroller 70 includes a microprocessor (or CPU) and a memory(s) (e.g., a Flash EPROM, RAM, ROM) operatively coupled the microprocessor (not separately shown) of the first microcontroller 70. The first microcontroller 70 has access to a number of programs that may be stored in the memory(s) of the first microcontroller 70, or alternately, may be stored remotely. In the illustrated example, the first microcontroller 70 has access to a first server program referred to herein as a security server program 76, and a second server program referred to herein as an end-point server program 74. While described as one program for ease of discussion, the end-point server program 74 may be one of any number of suitable server programs of the intelligent server device 42, depending on the functions of the intelligent server device 42. Although described as having the first microcontroller 70, as will be appreciated by those skilled in the art, the intelligent server device 42 may instead be configured with another microprocessor-based device or an FPGA device. Further, the first microcontroller 70 may include more than one microprocessor.

Referring again to the first microcontroller 70, unlike the end-point server program 74, the security server program 76 is adapted to act only as an arbiter between outside requests (from the intelligent client device 50) and the end-point server program 74, for security and protection purposes. As described below, any outside request from the intelligent client device 50, 51 for access to the end-point server program 74 must first be processed via the security server program 76.

The intelligent client device 50, 51 includes a second microcontroller 52 having a microprocessor and a memory operatively coupled to the microprocessor of the second microcontroller 52. Although not separately illustrated, each of the intelligent server devices 42, 44, 46 and each of the intelligent client devices 50, 51 include additional programs such as web programs, database programs, etc. Further, although described below in terms of a desktop computer, the intelligent client device 50, 51 may be any suitable intelligent device such as a personal digital assistant (PDA), a laptop computer, a mobile handset, to name a few. As a result, the communication channel established between the intelligent client device 50, 51 and the intelligent server device 42, 44, 46 may be enabled using one of a fiber link, an RF link, a wireline link, to name a few.

As previously noted, the end-point server program 74 may be one of a number of server programs associated with intelligent server device operation. For example, the end-point server program 74 may be a user account management server program adapted to enable access to user accounts for account management purposes. In another example, the end-point server program 74 may be an upgrade server program adapted to enable access to system services for purposes of upgrading the operating system or other firmware/software of the intelligent server device 42, 44, 46. Other end-point server programs 74 may include a number of general configuration server programs adapted to modify, upload or download configuration settings to the intelligent server device 42, 44, 46, or to initiate auto-configuration of the intelligent server device 42, 44, 46 to fetch specified setting values from the protective devices 100, 102, 104, etc. at specified time intervals for later analysis. Additional end-point server programs may include a number of data retrieval server programs adapted to retrieve and/or filter real-time or historical data collected and stored in an internal or external database storage by the intelligent server device 42, 44, 46 from the protective devices 100, 102, 104. Further end-point server programs may include a clear status server program adapted to clear a warning or failure status of the intelligent server device 42, 44, 46 (e.g., CPU usage exceeds a pre-defined limit warning), a clear event log server program adapted to clear the communication errors that may occur between the protective devices 100, 102, 104 and the intelligent server device 42, 44, 46, and a real-time control server program adapted to start, stop, and change settings or programmable logic in protective device 100, 102, 104. .

As noted above, prior to gaining access to the end-point server program 74 to, for example, update user account information utilized by the security server program 76, clear logged error records generated by the protective device 100, 102, 104, perform a software upgrade, upload protective device settings, etc., the user 56 located at the intelligent client device 50, 51 is required to first establish his/her access rights to the end-point server program 74 via the security server program 76.

Figure 3:
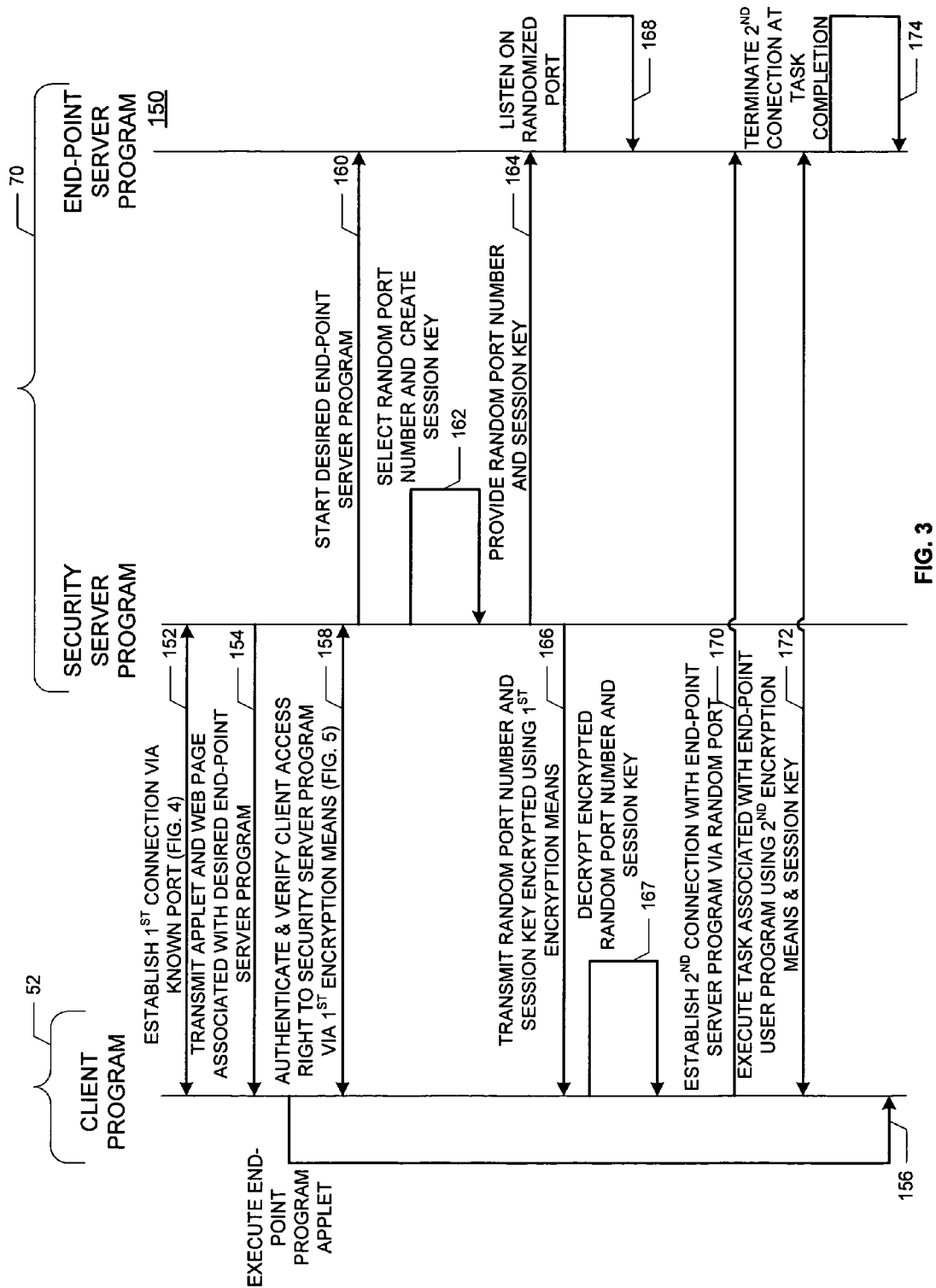
FIG. 3 is a ladder diagram of a method for enabling secure access to a program of the intelligent server device by an intelligent client device of FIG. 2, according to an embodiment of the invention.

For example, FIG. 3 is ladder diagram of a method 150 for enabling secure access to a program of the intelligent server device 42 by the intelligent client device 50, according to an embodiment of the invention.

Such secure communication enables the user 56 to gain access to the desired end-point server program 74. Although discussed in terms of the intelligent server device 42 and the intelligent client device 50, the method 150 is applicable to any intelligent client device attempting to gain access to a program of any intelligent server device.

Figure 4:
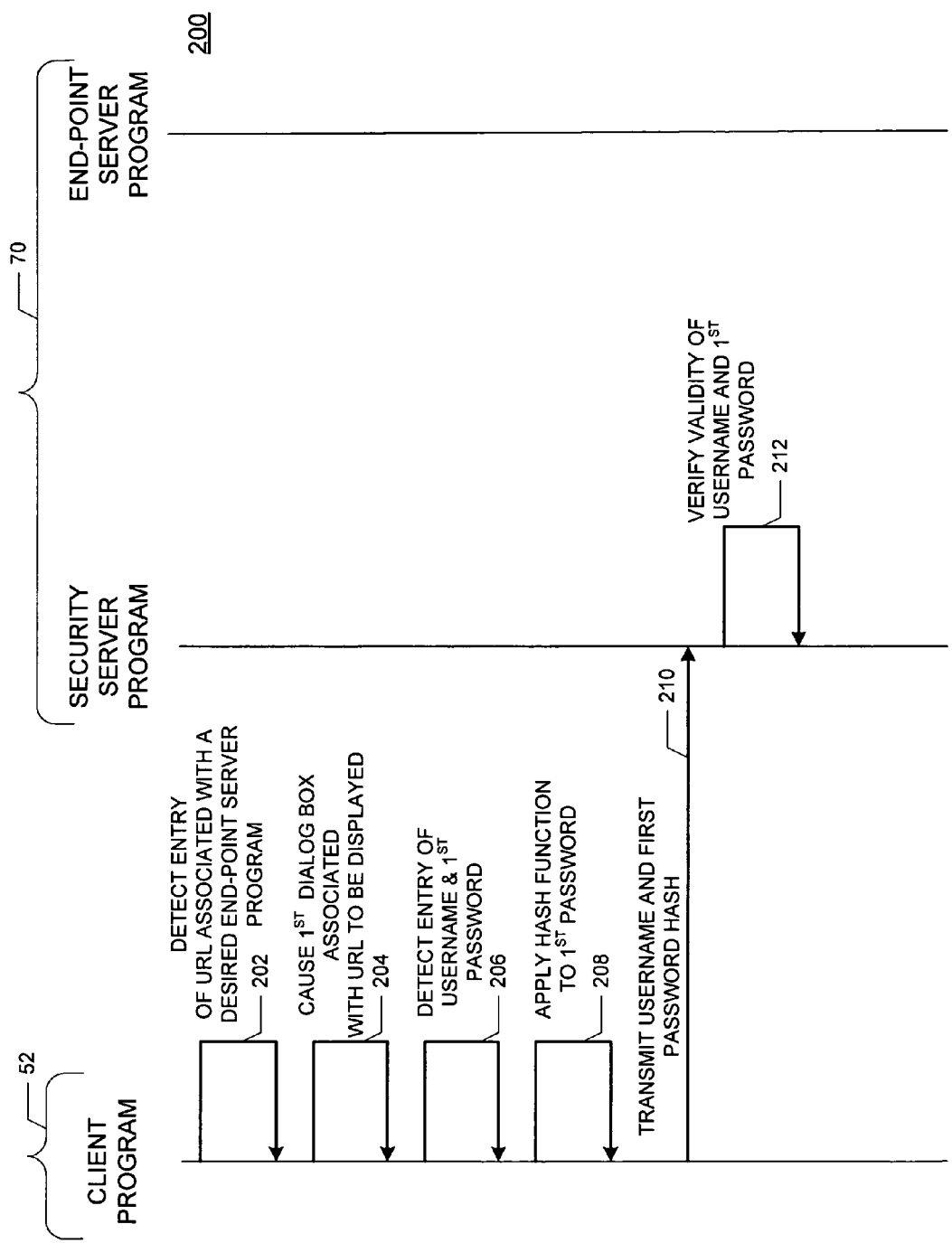
FIG. 4 is a ladder diagram of a method for establishing a secure connection between the intelligent client device and a known port of the intelligent server device of FIG. 2, according to an embodiment of the invention.

The method 150 begins with establishment of a first connection between the intelligent client device 50 and a known port of the intelligent server device 42 for subsequent transmission of an applet and web page associated with a desired end-point server program 74 to the intelligent client device 50 (step 152). The first connection may be established using one of any number of methods. For example, FIG. 4 is a ladder diagram of a method 200 for establishing the first connection between the intelligent client device 50 and a known port of the intelligent server device 42, according to an embodiment of the invention. Referring to FIG. 4, the first connection may established when the second microcontroller 52 detects user 56 entry of a uniform resource locator (URL) associated with a desired end-point server program 74 (step 202) and, in response, an associated dialog box (step 204) is provided on a display unit 80 of the intelligent client device 50. Upon detecting entry of the user's username and a first password (step 206), the second microcontroller 52 applies a hash function such as message digest 5 (MD5) to the first password to form a first password hash (step 208). The second microcontroller 52, executing a web browser program (not separately illustrated), then causes the username and first password hash to be transmitted to the intelligent server device 42 via a known port of the intelligent server device 42.

If a valid username and first password is entered, the first access level, referred to herein as access level 1, enables the user 56 to gain access to a web page and an applet corresponding to the desired end-point server program 74. A list (or table) of valid usernames and corresponding password hashes (e.g., three separate password hashes; one for each of three access levels) is preferably stored in non-volatile memory (e.g., compact flash) of the microcontroller 70 such that the first microcontroller 70 can "look-up" and compare received usernames and password hashes to the list.

Comparing the username and the first password hash to its list, the first microcontroller 70 determines whether the username and the first password hash is valid (step 212). If the username and/or first password hash is invalid, the secure connection is not established.

Referring again to FIG. 3, if the username and the first password hash is determined to be valid, the first microcontroller 70 causes an end-point client applet 54 and an associated web page (corresponding to the desired end-point server program 74) to be forwarded to the intelligent client device 50 (step 154).

One end-point client applet 54 and an associated web page, corresponds to an individual end-point server program 74. For example, if the end-point server program 74 is the user account management server program, the end-point program applet 54 is a user account management client applet. Similarly, if the end-point server program 74 is the upgrade server program, the end-point program applet 54 is an upgrade client applet, if the end-point server program 74 is any of the general configuration server programs, the end-point program applet 54 is an associated general configuration client applet, if the end-point server program 74 is any of the data retrieval server programs, the end-point program applet 54 is an associated data retrieval client applet, if the end-point server program 74 is the clear status server program, the end-point program applet 54 is a clear status client applet, and if the end-point server program 74 is any of the clear event log server programs, the end-point program applet is an associated clear event log client applet. Thus, when the end-point server program 74 desired by the user 56 is, for example, associated with the upgrade server program, upon receipt of a valid username and first password hash, the first microcontroller 70 causes an upgrade server client applet to be sent to the intelligent client device 50. Although discussed in terms of applets downloaded via use of the Web, it is contemplated that analogous application programs or parts of programs may be directly installed in the intelligent client device 50.

Each end-point program applet 54 includes, among other things, a request for its corresponding end-point server program 74 and a request for a user-entered password associated with an access level required for the corresponding end-point server program 74. Thus, when the end-point server program 74 desired by the user 56 is an upgrade server program, its associated upgrade server client applet (i.e., the end-point program applet 54) includes the request to the first microcontroller 70 for access to the upgrade server program and the request for a user-entered password associated with an access level for the upgrade server program (i.e., the end-point server program 74).

As noted above, the usernames and corresponding password hashes of all valid users 56 are maintained in the microcontroller 70 and are accessible via execution of the security server program 76, where each user 56 is associated with a username and one or more password hashes. Each password hash for a particular username is associated with one or more predetermined access levels. For example, a username and first password hash may be associated with the access level 1, yielding "read" only rights to a web page that may be associated with an applet such as the visualization applet. The same username and a second password hash may be associated with a second access level, referred to herein as an access level 2, yielding "read-write" only rights to an end-point server program 74 such as the data retrieval server program. The same username and a third password hash may be associated with a third access level, referred to herein as an access level 3, yielding full "administrator" rights to an end-point server program 74 such as the user account management server program.

Referring again to FIG. 3, upon with establishment of the first connection between the intelligent client device 50 and the known port of the intelligent server device 42 and subsequent transmission of an applet and web page associated with a desired end-point server program 74 from the intelligent server device 42 to the intelligent client device 50 (step 152), the second microcontroller 52 begins executing the end-point program applet 54 (step 156). While executing the end-point program applet 54 (step 156) and while using the established first connection, the intelligent client device 50 authenticates and verifies intelligent client device access rights to the security server program 76 of the intelligent server device 42 using a first encryption means (step 158).

Authentication and verification of intelligent client device access rights to the security server program 76 may be established using one of any number of suitable first encryption means such as asymmetric encryption, password-based encryption and the like. For example, if asymmetric encryption is used, the first and second microcontroller 70 and 52, respectively, obtain each other's public key through a digital certificate from a mutually trusted authority. The public key is then used to encrypt messages sent between the intelligent client device 50 and the intelligent server device 42. The digital certificate is incorporated in the encrypted message so that fraudulent attempts to use another's public key will result in unreadable messages.

In another example, if a password-based encryption method such as public-key cryptography standard (PKCS) #5 v2.0 is utilized to establish the secure connection, a random salt, password hash and an iteration count is used to generate an access level random key that is used to encrypt and decrypt an authentication message forwarded from the second microcontroller 52 to the first microcontroller 70. For ease of discussion, establishment of the secure channel will be discussed in terms of PKCS #5 v2.0.

Figure 5:
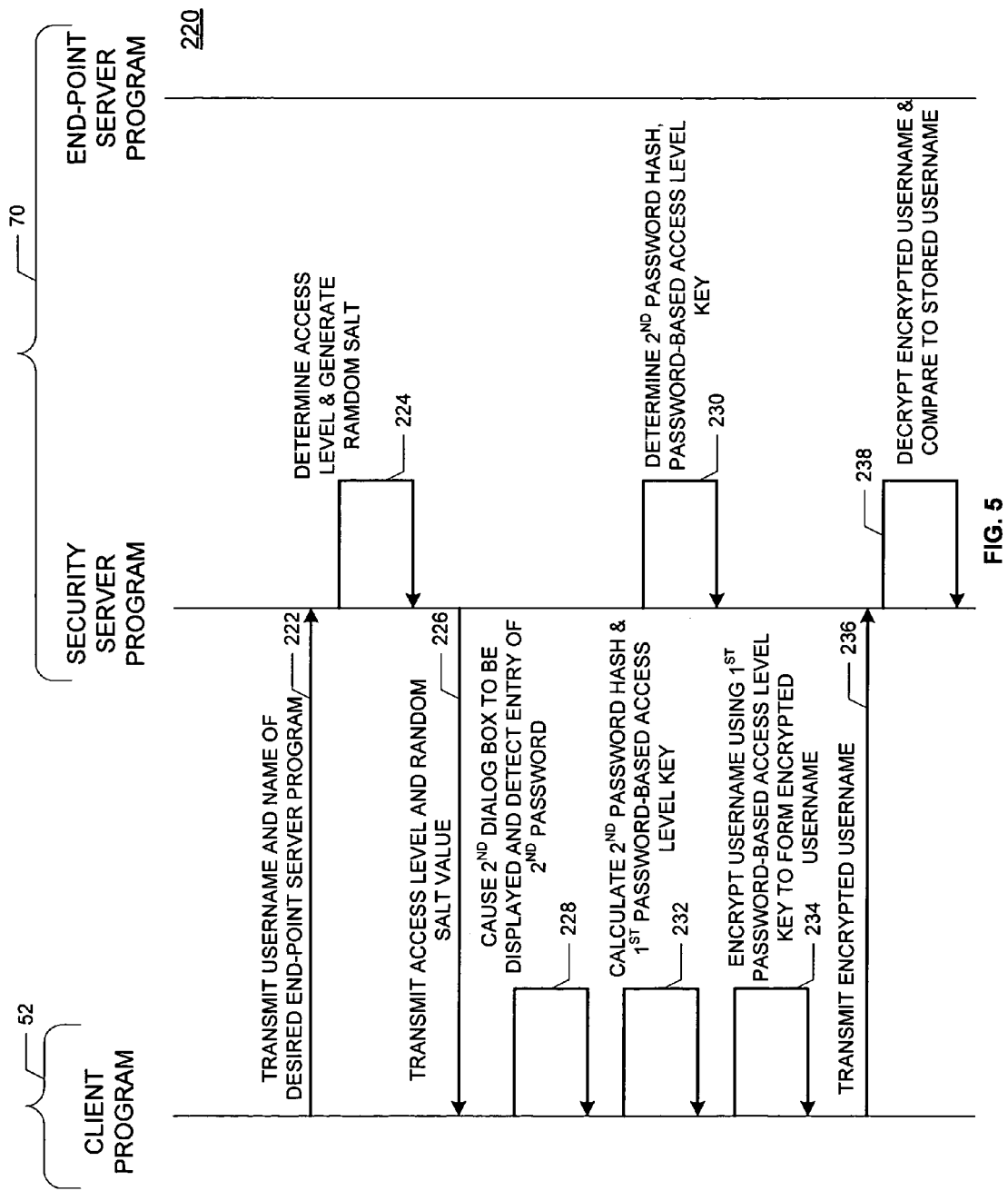
FIG. 5 is a ladder diagram of a method for authenticating and verifying intelligent client device access rights to a security server program of the intelligent client device of FIG. 2, according to an embodiment of the invention.

FIG. 5 is a ladder diagram of a method 220 for authenticating and verifying intelligent client device access rights to the security server program 76 of the intelligent client device 50, according to an embodiment of the invention. Referring to FIG. 5, while executing the received end-point program applet 54, the second microcontroller 52 causes the user's username and the name of the desired end-point server program 74 to be transmitted to the first microcontroller 70 (step 222) The user does not have to reenter his/her username. Upon receipt of the username and the name of the desired end-point server program 74, the first microcontroller 70 executing the security server program 76 determines the proper access level for the desired end-point server program 74. The first microcontroller 70 also generates a first random salt S (i.e., random octet string) using one of any number of well-known techniques such as a random number generator (RNG), a random event such as system interrupts from serial/Ethernet port, etc. (step 224).

Upon determining the appropriate access level, the first microcontroller 70 causes the first random salt S and the appropriate access level to be transmitted to the second microcontroller 52 (step 226). The second microcontroller 52, executing the end-point program applet 52 then causes another dialog box to be displayed to the user 56 via the display 80. Upon detecting entry of a second password (e.g., the access level 2 password), by the user 56 (step 228), the second microcontroller 52 calculates a second password hash $H_1$ via a hash function (e.g., secure hash algorithm-SHA) provided by the end-point program applet 54. Using the calculated second password hash $H_1$, the first random salt S received from the first microcontroller 70, and an iteration count IC (i.e., a positive integer that determines how many times to iterate some underlying function by which a password-based key is derived) predefined in the end-point program applet 52, the second microcontroller 52 calculates a first password-based access level key $K_1$ 60a (step 232). Substantially concurrently, the first microcontroller 70, using a stored second password hash $H_2$ (associated with the username and the desired end-point server program 74), the random salt S and the iteration count IC, calculates a second password-based key $K_2$ 60b (step 230). If the calculated second password hash $H_1$ is valid, the first and second password-based keys 60a, 60b are equal.

The second microcontroller 52, executing the end-point program applet 54, encrypts the username with the first password-based access-level key $K_1$ 60a (step 234) and causes the encrypted username to be transmitted to the first microcontroller 70 (step 236). While executing the security server program 76, the first microcontroller 70 decrypts the received encrypted username (via its password-based access-level key $K_2$ 60b) to form a decrypted username, and then compares the decrypted username with the user's stored username included in the list (step 238). If the decrypted username does not match the username in the list, the first microcontroller 70 indicates to the second microcontroller 52 that the second password entered by the user 56 is incorrect. The first microcontroller 70 executing the security server program 76 then causes another transmission, including the first salt and the appropriate access level to be forwarded to the second microcontroller 52, and the user is again given an opportunity to enter his/her second password via the dialog box displayed on the display 80. If the re-entered second password is determined to be incorrect by the first microcontroller 70 a predetermined number of times (e.g., three), the first microcontroller 70 executing the security server program 76 causes the communication link between the intelligent client device 50 and the intelligent server device 42 to be disconnected.

In some cases, the user 56 may desire an end-point server program requiring the highest access level. In that case, steps 222 through 238 are repeated with a new random salt and another password entered by the user 56. As described above, the first microcontroller 70 determines the required access level, generates a second random salt and transmits the both to the second microcontroller 52. Upon detecting entry of a third password (e.g., the access level 3 password), the second microcontroller 52 calculates a third password hash and using the third password hash, the second random salt and the iteration count, calculates a new password-based access level key. Using the new password-based access level key, the second microcontroller 52 encrypts the username to form a second encrypted username and causes it to be transmitted to the first microcontroller 70 where it is decrypted using a new password-based access level key as described above. Again the decrypted username is compared to the stored username by the first microcontroller.

Referring again to FIG. 3, if the decrypted username matches the username in the list accessible by the first microcontroller 70, the client's access right to the security server program is verified (step 158). In response, the microcontroller 70 executing the security server program 76 starts the desired end-point server program 74 (step 160), selects a random port number of the intelligent server device 42 and generates a session key 62 (step 162), using one of any number of well-known techniques such as the RNG. The session key 62 is subsequently encrypted using the second password-based access level key $K_2$ 60b for transmission to the intelligent client device 50 as discussed below.

Selection and subsequent use of the random port is important for a number of reasons. For example, use of a randomized port lessens a chance of port sniffing by an eavesdropper. If successful, a port sniffing via a port sniffing program can allow an eavesdropper to capture the data transmitted between the intelligent server device 42 and the intelligent client device 50. Use of the randomized port scheme disclosed herein also protects the intelligent server device 42 from reconnaissance, an attack by or the uploading of malicious code or firmware by an eavesdropper, to name a few.

Referring again to FIG. 3, the first microcontroller 70 executing the security server program 76 makes the random port number and the session key 62 available for use during execution of the end-point server program 74 (step 164), encrypts the random port number and the session key 62 via the second password-based access level key $K_2$ 60b and causes it to be forwarded to the second microcontroller 52 (step 166). In response, the first microcontroller 70 executing the end-point server program "listens" on the port associated with the random port number during execution of a task corresponding to the requested end-point server program 74 (step 168).

The second microcontroller 52 executing the end-point program applet 54, establishes a second connection between the intelligent client device 50 and the random port of intelligent server device 42 (step 170) and applies the session key 62 using symmetric encryption to subsequent transmissions. In addition, the second microcontroller 52, executing the end-point program applet 54, causes a graphic user interface (GUI) corresponding to the requested end-point server program 74 to be displayed to the user 56 via the display unit 80.

FIG. 6 is an exemplary graphic user interface 300 that may be displayed to the user 56 when the desired end-point server program 74 is one of the general configuration server programs. Displaying the graphic user interface 300 on the display unit 80 enables, for example, configuration settings of the intelligent server device 42 to be modified by the user 56. Such configuration settings are used by the intelligent server device 42 to initiate connections with the protective devices 100, 102,104. As discussed above, selection of one of the end-point server programs 74 (e.g., user account management program, upgrade server program) enables the user to perform other intelligent server-related tasks. In addition, as will be appreciated by those skilled in the art, the graphic user interface 300 may be configured in one of any number of designs.

Referring to FIG. 6, on one side, the graphic user interface 300 includes a tree-view 302 of eight intelligent server settings groups; phasor data concentrator (PDC) general data, network, email, PMU serial connection, PMU Ethernet connection, PDC output, diagnostics, and current configuration. Each of the eight intelligent server settings groups includes one or more settings.

For example, if the PDC general data is selected, five settings associated with the PDC are displayed on the other side of the graphic user interface 300. The five settings include a phasor data concentrator station name (PDCSTN) 304, or the name of the intelligent server device 42, a phasor data concentrator ID (PDCID) 306, or the ID of the intelligent server device 42, a nominal system frequency (NFREQ) 208 of the intelligent server device 42. The user 56 may select from either 60 Hz (for the US) or 50 Hz (for China) when modifying the NFREQ 308. The five settings also include a message rate (MRATE) 310 or input rate of the connecting protective device 100, 102, 104 per second, and maximum message waiting period (MWAITP) 312. The MWAITP 312 is the time period that the first microcontroller 70 waits for a next message when receiving real-time data from a protective device such as the protective device 102. For example, if the MWAITP 312 is selected to be 10 milliseconds and the MRATE is selected to be 10 messages per second, the first microcontroller 70 should ideally receive messages from the protective device 102 every 100+10 milliseconds.

Referring again in FIG. 3, the task corresponding to the desired end-point server program 74, is executed (step 172) utilizing a second encryption means; in the instant example, symmetric encryption/decryption using the session key 62 to secure the transmissions between the intelligent client device 50 and the random port of intelligent server device 42. It is contemplated that the second encryption means may be one of any number of suitable encryption/decryption means. Execution of the end-point server program 74 is stopped and the second connection terminated upon task completion (step 174).

As may be apparent from the above discussion, implementation of the apparatus and method disclosed provided security, efficiency and availability to a wide range of end-point users. First, because the session key is utilized for symmetric encryption by the first microcontroller 70 executing the end-point server program and the second microcontroller executing the end-point client program applet 54, communication is efficient and fast. Further, use of the randomized port number reduces the chance of eavesdropping, and because it's only used for one session, the duration of exposure of the randomized port is limited.

While this invention has been described with reference to certain illustrative aspects, it will be understood that this description shall not be construed in a limiting sense. Rather, various changes and modifications can be made to the illustrative embodiments without departing from the true spirit, central characteristics and scope of the invention, including those combinations of features that are individually disclosed or claimed herein. Furthermore, it will be appreciated that any such changes and modifications will be recognized by those skilled in the art as an equivalent to one or more elements of the following claims, and shall be covered by such claims to the fullest extent permitted by law.

What is claimed is:

1. A system for enabling secure access to a desired end-point server program of at least one end-point server program, the system comprising:

an intelligent server device having a first microcontroller, the first microcontroller having access to a security server program and the at least one end-point server program, the at least one end-point server program associated with an aspect of operation of the intelligent server device; and an intelligent client device having an input device, a display unit and a second microcontroller operatively coupled to the input device and the display unit, the first microcontroller adapted to:

establish a first connection between the intelligent client device and a known port of the intelligent server device;

cause an end-point program applet and web page associated with the desired end point server program to be forwarded to the intelligent client device; and while executing the security server program:

authenticate and verify intelligent client device access rights to the security server program via a first encryption means, select a random port number and create a session key if the intelligent client device access rights are authenticated and validated, cause the random port number and the session key to be encrypted via the first encryption means, and transmitted to the intelligent client device, and detect establishment of a second connection between the intelligent client device and a random port of the intelligent server device, the second connection enabling secure access by the intelligent client device to the desired end-point server program, the random port corresponding to the random port number.

2. The system of claim 1, wherein the first microcontroller is further adapted to enable execution of a task associated with the desired end-point server program, execution of the task including a second encryption means associated with the session key.

3. The system of claim 2, wherein the first microcontroller is further adapted to:

start the end-point server program after the intelligent client device access rights to the security server program are authenticated and verified; and while executing the end-point server program:

listen on the random port, and terminate the second connection upon completion of the task.

4. The system of claim 2, wherein second encryption means is selected from the group consisting of a symmetric encryption and decryption standard, and an asymmetric encryption and decryption standard.

5. The system of claim 1, wherein establishing the first connection comprises:

receiving a username and a first password hash associated with a first password corresponding to a first access level, the first password hash generated by applying a first hash function to the first password, the username and the first password entered in a first dialog box via the input device, the dialog box displayed on the display unit in response to user entry of a uniform resource locator associated with the desired end-point server program; and verifying that the username and first password hash are valid.

6. The system of claim 5, wherein authenticating and verifying intelligent client device access rights to the security server program via the first encryption means comprises:

receiving the username and a name of the desired end-point server program;

determining a second access level associated with the desired end-point server program;

generating a first random salt;

transmitting the first random salt and an indication of the second access level;

based on the username and the second access level, look-up a stored second password hash;

calculating a first server password-based access level key based on the stored second password hash;

receiving a first encrypted username, the first encrypted username formed by applying a first client password-based access level key, the first client password-based access level key calculated based on a calculated second password hash, the calculated second password hash based on a second password entered in a second dialog box via the input device;

decrypting the first encrypted username with the first server password-based access level key to form a first decrypted username; and comparing the first decrypted username to the username.

7. The system of claim 6, wherein authenticating and verifying intelligent client device access rights to the security server program via the first encryption means further comprises enabling intelligent client device access rights to the security server program if the first decryption username is determined to be identical to the username.

8. The system of claim 6, wherein each of the first server password-based access level key and first client password-based access level key is further based on the first random salt and an iteration count.

9. The system of claim 6, wherein authenticating and verifying intelligent client device access rights to the security server program via the first encryption means further comprises:

determining a third access level associated with the desired end-point server program;

generating a second random salt;

transmitting the second random salt and an indication of the third access level;

based on the username and the third access level, look-up a stored third password hash;

calculating a second server password-based access level key based on the stored third password hash;

receiving a second encrypted username, the second encrypted username formed by applying a second client password-based access level key, the second client password-based access level key calculated based on a calculated third password hash, the calculated third password hash based on a third password entered in a third dialog box via the input device;

decrypting the second encrypted username with the second server password-based access level key to form a second decrypted username;

comparing the second decrypted username to the username; and enabling intelligent client device access rights to the security server program if the second decrypted username is determined to be identical to the username.

10. The system of claim 5, wherein authenticating and verifying intelligent client device access rights to the security server program via the first encryption means includes application of a public-key cryptography standard.

11. The system of claim 5, wherein authenticating and verifying intelligent client device access rights to the security server program via the first encryption means includes application of an asymmetric encryption and decryption standard.

12. The system of claim 5, wherein authenticating and verifying intelligent client device access rights to the security server program via the first encryption means includes application of a symmetric encryption and decryption standard.

13. A system for enabling secure access to a desired end-point server program of at least one end-point server program, the system comprising:

an intelligent server device having a first microcontroller, the first microcontroller having access to a security server program and the at least one end-point server program, the at least end-point server program associated with an aspect of operation of the intelligent server device; and an intelligent client device having an input device, a display unit and a second microcontroller operatively coupled to the input device and the display unit, the second microcontroller adapted to:

detect establishment of a first connection via a known port of the intelligent server device;

receive an end-point program applet and web page associated with the desired end-point server program; and while executing the end-point program applet:

detect authentication and verification of access rights to the security server program, authentication and verification of access rights including a first encryption means, receive an encrypted random port number and an encrypted session key, the session key and the random port number generated and encrypted via the first encryption means by the first encryption means by the first microcontroller executing the security server program, decrypt the encrypted random port number and the encrypted session key via the first encryption means to determine the session key and the random port number, and detect establishment of a second connection with a random port of the intelligent server device, the second connection enabling secure access to the desired end-point server program, the random port corresponding to the random port number.

14. The system of claim 13, wherein the second microcontroller is further adapted to provide a graphic user interface and enable execution of a task associated with the desired end-point server program, execution of the task including a second encryption means associated with the session key.

15. The system of claim 14, wherein the second microcontroller is further adapted to:

terminate execution of the end-point program applet upon completion of the task.

16. The system of claim 14, wherein second encryption means is selected from the group consisting of a symmetric encryption and decryption standard, and an asymmetric encryption and decryption standard.

17. The system of claim 13, wherein detecting establishment of the first connection comprises:

detecting user entry of a uniform resource locator associated with the desired end-point server program;

causing a first dialog box associated with the uniform resource locator to be displayed;

detecting entry of a username and a first password in the first dialog box, the first password corresponding to a first access level;

applying a first hash function to the first password to form a first password hash; and transmitting the username and first password hash.

18. The system of claim 17, wherein authenticating and verifying intelligent client device access rights to the security server program via the first encryption means comprises:

transmitting the username and a name of the desired end-point server program;

receiving a first random salt and an indication of a second access level, the second access level associated with the desired end-point server program;

causing a second dialog box associated with the second access level to be displayed;

detecting entry of a second password in the second dialog box;

calculating a second password hash based on the second password;

calculating a first client password-based access level key based on the calculated second password hash;

applying the first client password-based access level key to the username to form a first encrypted username; and transmitting the first encrypted username.

19. The system of claim 18, wherein authenticating and verifying intelligent client device access rights to the security server program via the first encryption means further comprises enabling intelligent client device access rights to the security server program if the first encrypted username is decrypted and is determined to be identical to the username by the first microcontroller.

20. The system of claim 18, wherein each of the first server password-based access level key and first client password-based access level key is further based on the first random salt and an iteration count.

21. The system of claim 18, wherein authenticating and verifying intelligent client device access rights to the security server program via the first encryption means further comprises:

receiving a second random salt and an indication of a third access level, the third access level associated with the desired end-point server program;

causing a third dialog box associated with the third access level to be displayed;

detecting entry of a third password in the third dialog box;

calculating a third password hash based on the third password;

calculating a second client password-based access level key to the username to form a second encrypted username; and transmitting the second encrypted username.

22. The system of claim 17, wherein authenticating and verifying intelligent client device access rights to the security server program via the first encryption means includes application of a public-key cryptography standard.

23. The system of claim 17, wherein authenticating and verifying intelligent client device access rights to the security server program via the first encryption means includes application of an asymmetric encryption and decryption standard.

24. The system of claim 17, wherein authenticating and verifying intelligent client device access rights to the security program via the first encryption means includes application of a symmetric encryption and decryption standard.

25. A method for enabling secure access by an intelligent client device to a desired end-point server program of at least one end-point server program of an intelligent server device, the at least one end-point server program associated with an aspect of operation of the intelligent server device, the intelligent server device further including a security server program, the method comprising:

establishing a first connection between the intelligent client device and a known port of the intelligent server device;

causing an end-point program applet and web page associated with the desired end-point server program to be forwarded to the intelligent client device; and while executing the security server program:

authenticating and verify intelligent client device access rights to the security server program via a first encryption means, selecting a random port number and create a session key if the intelligent client device access rights are authenticated and validated, causing the random port number and the session key to be encrypted via the first encryption means, and transmitted to the intelligent client device, and detecting establishment of a second connection between the intelligent client device and a random port of the intelligent server device, the second connection enabling secure access by the intelligent client device to the desired end-point server program, the random port corresponding to the random port number.

26. The method of claim 25, further comprising providing a graphic user interface and enabling execution of a task associated with the desired end-point server program, execution of the task including a second encryption means associated with the session key.

27. The method of claim 26, further comprising:

starting the end-point server program after the intelligent client device access rights to the security server program are authenticated and verified; and while executing the end-point server program:

listening on the random port, and terminating the second connection upon completion of the task.

28. The method of claim 26, wherein second encryption means is selected from the group consisting of a symmetric encryption and decryption standard, and an asymmetric encryption and decryption standard.

29. The method of claim 25, wherein establishing the fist connection comprises:

receiving a username and a first password hash associated with a first password corresponding to a first access level, the first password hash generated by applying a first hash function to the first password, the username and the first password entered in a first dialog box via the input device, the dialog box display unit in response to user entry of a uniform resource locator associated with the desired end-point server program; and verifying that the username and first password hash are valid.

30. The method of claim 29, wherein authenticating and verifying intelligent client device access rights to the security server program via the first encryption means comprises:

receiving the username and a name of the desired end-point server program;

determining a second access level associated with the desired end-point server program;

generating a first random salt;

transmitting the first random salt and an indication of the second access level;

based on the username and the second access level, look-up a stored second password hash;

calculating a first server password-based access level key based on the stored second password hash;

receiving a first encrypted username, the first encrypted username formed by applying a first client password-based access level key, the first client password-based access level key calculated based on a calculated second password hash, the calculated second password hash based on a second password entered in a second dialog box via the input device;

decrypting the first encrypted username with the first server password-based access level key to form a first decrypted username; and comparing the first decrypted username to the username.

31. The method of claim 30, wherein authenticating and verifying intelligent client device access rights to the security server program via the first encryption means further comprises enabling intelligent client device access rights to the security server program if the first decrypted username is determined to be identical to the username.

32. The method of claim 30, wherein each of the first server password-based access level key and first client password-based access level key is further based on the first random salt and an iteration count.

33. The method of claim 30, wherein authenticating and verifying intelligent client device access rights to the security server program via the first encryption means further comprises:

determining a third access level associated with the desired end-point server program;

generating a second random salt;

transmitting the second random salt and an indication of the third access level;

based on the username and the third access level, look-up a stored third password hash;

calculating a second server password-based access level key based on the stored third password hash;

receiving a second encrypted username, the second encrypted username formed by applying a second client password-based access level key, the second client password-based access level key calculated based on a calculated third password hash, the calculated third password hash based on a third password entered in a third dialog box via the input device;

decrypting the second encrypted username with the second server password-based access level key to form a second decrypted username;

comparing the second decrypted username to the username; and enabling intelligent client device access rights to the security server program if the second decrypted username is determined to be identical to the username.

34. The method of claim 29, wherein authenticating and verifying intelligent client device access rights to the security server program via the first encryption means includes application of an asymmetric encryption and decryption standard.

35. The method of claim 29, wherein authenticating and verifying intelligent client device access rights to the security server program via the first encryption means includes application of an asymmetric encryption and decryption standard.

36. The method of claim 29, wherein authenticating and verifying intelligent client device access rights to the security server program via the first encryption means includes application of a symmetric encryption and decryption standard.

37. A method for enabling secure access by an intelligent client device to a desired end-point server program of at least one end-point server program of an intelligent server device, the at least one end-point server program associated with an aspect of operation of the intelligent server device, the intelligent server device further including a security server program, the method comprising:

detecting establishment of a first connection via a known port of the intelligent server device;

receiving an end-point program applet and web page associated with the desired end-point server program; and while executing the end-point program applet:

detecting authentication and verification of access rights to the security server program, authentication and verification of access rights including a first encryption means, receiving an encrypted random port number and an encrypted session key, the session key and the random port number generated and encrypted via the first encryption means by the first microcontroller executing the security server program, decrypting the encrypted random port number and the encrypted session key via the first encryption means to determine the session key and the random port number, and detecting establishment of a second connection with a random port of the intelligent server device, the second connection enabling secure access to the desired end-point server program, the random port corresponding to the random port number.

38. The method of claim 37, further comprising enabling execution of a task associated with the desired end-point server program, execution of the task including a second encryption means associated with the session key.

39. The method of claim 38, further comprising:

terminating execution of the end-point program applet upon completion of the task.

40. The method of claim 38, wherein second encryption means is selected from the group consisting of a symmetric encryption and decryption standard, and an asymmetric encryption and decryption standard.

41. The method of claim 37, wherein detecting establishment of the first connection comprises:

detecting user entry of a uniform resource locator associated with the desired end-point server program;

causing a first dialog box associated with the uniform resource locator to be displayed;

detecting entry of a username and a first password in the first dialog box, the first password corresponding to a first access level;

applying a first hash function to the first password to form a first password hash; and transmitting the username and first password hash.

42. The method of claim 41, wherein authenticating and verifying intelligent client device access rights to the security server program via the first encryption means comprises:

transmitting the username and a name of the desired end-point server program;

receiving a first random salt and an indication of a second access level, the second access level associated with the desired end-point server program;

causing a second dialog box associated with the second access level to be displayed;

detecting entry of a second password in the second dialog box;

calculating a second password hash based on the second password;

calculating a first client password-based access level key based on the calculated second password hash;

applying the first client password-based access level key to the username to form a first encrypted username; and transmitting the first encrypted username.

43. The method of claim 42, wherein authenticating and verifying intelligent client device access rights to the security server program via the first encryption means further comprises enabling intelligent client device access rights to the security server program if the first encrypted username is decrypted and is determined to be identical.

44. The method of claim 42, wherein each of the first server password-based access level key and first client password-based access level key is further based on the first random salt and an iteration count.

45. The method of claim 42, wherein authenticating and verifying intelligent client device access rights to the security server program via first encryption means further comprises:
  receiving a second random salt and an indication of a third access level, the third access level associated with the desired end-point server program;
  causing a third dialog box associated with the third access level to be displayed;
    detecting entry of a third password in the third dialog box;
    calculating a third password hash based on the third password;
    calculating a second client password-based access level key based on the calculated third password hash;
    applying the second client password-based access level key to the username to form a second encrypted username; and
    transmitting the second encrypted username.

46. The method of claim 41, wherein authenticating and verifying intelligent client device access rights to the security server program via the first encryption means includes application of a public-key cryptography standard.

47. The method of claim 41, wherein authenticating and verifying intelligent client device access rights to the security server program via the first encryption means includes application of an asymmetric encryption and decryption standard.

48. The method of claim 41, wherein authenticating and verifying intelligent client device access rights to the security server program via the first encryption means includes application of a symmetric encryption and decryption standard.

* * * * *